(12) United States Patent
Postiglione (10) Patent No.: US 9,666,379 B2
(45) Date of Patent: May 30, 2017

(54) NICKEL SUPERCAPACITOR ENGINE STARTING MODULE

(71) Applicant: SAFT AMERICA, Valdosta, GA (US)

(72) Inventor: Carl Postiglione, Saint Augustine, FL (US)

(73) Assignee: SAFT AMERICA, Valdosta, GA (US)

( * ) Notice: Subject to any disclaimer, the term of this patent is extended or adjusted under 35 U.S.C. 154(b) by 0 days.

(21) Appl. No.: 14/657,136

(22) Filed: Mar. 13, 2015

(65) Prior Publication Data

US 2016/0268058 A1    Sep. 15, 2016

(51) Int. Cl.
*H01G 11/04* (2013.01)
*H01G 11/28* (2013.01)
*H01G 11/32* (2013.01)
*H01G 11/62* (2013.01)
*H01G 11/52* (2013.01)
*F02N 11/08* (2006.01)
*H01G 11/08* (2013.01)
*H02J 7/34* (2006.01)
*H02J 7/14* (2006.01)
*H01M 12/00* (2006.01)

(52) U.S. Cl.
CPC ......... *H01G 11/04* (2013.01); *F02N 11/0866* (2013.01); *H01G 11/08* (2013.01); *H01G 11/28* (2013.01); *H01G 11/32* (2013.01); *H01G 11/52* (2013.01); *H01G 11/62* (2013.01); *H01M 12/005* (2013.01); *H02J 7/14* (2013.01); *H02J 7/345* (2013.01); *Y02E 60/13* (2013.01)

(58) Field of Classification Search
CPC ........ H01G 11/04; H01G 11/08; H01G 11/28; F02N 11/0866
USPC ................................. 318/34, 90, 92
See application file for complete search history.

(56) References Cited

U.S. PATENT DOCUMENTS

| | | | | |
|---|---|---|---|---|
| 5,373,195 | A * | 12/1994 | De Doncker | B60L 11/005 307/45 |
| 5,723,956 | A * | 3/1998 | King | B60L 11/005 307/44 |
| 6,020,696 | A * | 2/2000 | Matsunaga | B60L 3/00 318/139 |
| 6,356,432 | B1 | 3/2002 | Danel et al. | |
| 6,373,152 | B1 * | 4/2002 | Wang | H02J 7/345 307/109 |
| 7,489,048 | B2 * | 2/2009 | King | B60L 11/1864 307/10.1 |
| 7,684,768 | B1 * | 3/2010 | Fest | H04B 1/04 307/125 |
| 7,780,562 | B2 * | 8/2010 | King | B60K 6/26 475/5 |
| 8,384,360 | B2 * | 2/2013 | Cegnar | 320/104 |

(Continued)

FOREIGN PATENT DOCUMENTS

EP    1 156 500 A1    11/2001
EP    1 883 937       2/2008

*Primary Examiner* — Kawing Chan
(74) *Attorney, Agent, or Firm* — Sughrue Mion, PLLC (57) ABSTRACT

This invention relates to a supercapacitor assembly having an asymmetric supercapacitor, a diode, and a switch in parallel with the diode. The asymmetric supercapacitor has at least one positive electrode, at least one negative electrode, and at least one separator impregnated with an electrolyte. The diode has an anode and a cathode, the cathode being electrically connected to the supercapacitor.

14 Claims, 9 Drawing Sheets

(56) References Cited

U.S. PATENT DOCUMENTS

| | | | |
|---|---|---|---|
| 2008/0160370 A1* | 7/2008 | Masse | H01M 8/04589 429/429 |
| 2012/0300367 A1* | 11/2012 | Chevalier | H01G 11/50 361/502 |
| 2014/0103722 A1* | 4/2014 | Namuduri | B60L 1/003 307/39 |
| 2014/0246906 A1* | 9/2014 | Wang | H02J 9/061 307/23 |

* cited by examiner

NICKEL SUPERCAPACITOR ENGINE STARTING MODULE

BACKGROUND OF THE INVENTION

Field of the Invention

The technical field of the invention is that of a device including a supercapacitor to provide power to start an engine.

Background

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Conventional vehicle engine starting systems may use a battery to supply a starter motor with power to crank a vehicle's engine. However, often times, particularly in cold weather, a battery may not supply sufficient power to the starter to start the engine. Also, the battery may wear overtime after numerous discharges.

Throughout this disclosure reference is made to an energy storage system called "supercapacitor," also known as "supercapacitance," or "electrochemical double-layer condenser" and designated as "Electric Double Layer Capacitor (EDLC)," or additionally as "ultracapacitance" and "ultracapacitor." This is a device allowing energy storage by means of ion accumulation on two electrodes serving as ion collectors when a potential difference is applied between them. The term "supercapacitor" will be used throughout the remainder of this document and it is obvious that this vocabulary also designates the equivalent terminologies mentioned above. An electrochemical supercapacitor comprises at least one positive electrode and at least one negative electrode. Both electrodes are separated from one another by a separator. The electrochemical bundle formed by the assembly of the positive and negative electrodes and the separators is impregnated with an electrolyte.

There are several variations on the design of a supercapacitor. For example, supercapacitors may be symmetric supercapacitors with an aqueous electrolyte, in which the positive electrode and the negative electrode consist of similar materials having the same capacitance. Most often, active carbon is used. Patent application EP-A-1883 937 describes the manufacturing of an electrode based on active carbon which may be used in the design of symmetric supercapacitors with an aqueous electrolyte.

Alternatively, a non-aqueous electrolyte may be used with a symmetric supercapacitor. As described in U.S. Pat. No. 6,356,432, the supercapacitor comprises a non-aqueous electrolyte, such as acetonitrile, and two carbon electrodes, each electrode comprising a binder and an electrochemically active material consisting of active carbon having a specific surface area greater than 2,000 m2/g.

In addition, a supercapacitor may be an asymmetric supercapacitor (or hybrid supercapacitor) with an aqueous electrolyte. Patent application EP-A-1 156 500 describes the general operating principle of this type of supercapacitor. This supercapacitor comprises one negative electrode based on active carbon and one positive electrode whose active material may be reversibly oxidized. The positive electrode is charged by a Faradic process while the negative electrode is charged by ion accumulation at the electrode/electrolyte interface forming a double layer. The charge accumulation occurring at the negative electrode corresponds to a non-Faradic process.

SUMMARY OF THE INVENTION

The present invention provides a supercapacitor assembly which has a nickel-carbon ("NiCap") asymmetric supercapacitor connected to an isolation component, such as a blocking diode. The NiCap asymmetric supercapacitor has a positive electrochemically active material (or positive electrode) which is a nickel-based hydroxide, and a negative electrode which comprises a current collector and a carbon-based active material. The positive and negative electrodes are separated from one another by a separator that is a porous membrane impregnated with alkaline electrolyte, such as KOH and/or NaOH and/or LiOH.

In a non-limiting embodiment, the supercapacitor assembly of this application may be connected to a battery or power supply such that the supercapacitor and the battery may form part of a starting module which is used to start the starter motor. The supercapacitor assembly and asymmetric supercapacitor, among other features, may be used allow large vehicle engines to start using a safe non-flammable electrolyte in much colder weather than other technologies.

One concern of connecting a supercapacitor to a battery is that since the power source and supercapacitor are connected in parallel, the supercapacitor may drain its charge into the battery. An asymmetric supercapacitor, and particularly the NiCap asymmetric supercapacitor, has a low self-discharge rate as compared to conventional supercapacitors, however, an isolation technique is contemplated to prevent the supercapacitor from discharging into the vehicle's batteries and to allow the engine to start more efficiently. A compact isolation technique that does not require modification to the vehicle's wiring may be preferred because such rewiring may often void a vehicle's warranty.

With aspects of this present invention the supercapacitor assembly provides supercapacitor isolation with little modification to a vehicle's wiring. Further, the supercapacitor of this invention is able to be idle for a long period of time, even in cold weather, without losing its charge. Further, the asymmetric supercapacitor may be easily recharged between engine starting crank attempts in approximately 10 to 15 seconds.

Through the multiple embodiments, the supercapacitor assembly of this invention reduces the costs of materials and cost of assembly, and allows for easier and quicker installation and isolation. Example embodiments of this application may address one or more of the above identified issues. However, an embodiment of this application need not solve, address, or otherwise improve on existing technologies.

BRIEF DESCRIPTION OF THE DRAWINGS

In the following detailed description, reference will be made to the accompanying drawing(s), in which similar elements are designated with similar numerals. The aforementioned accompanying drawings show by way of illustration and not by way of limitation, specific example embodiments and implementations consistent with principles of an example embodiment. These implementations are described in sufficient detail to enable those skilled in the art to practice an example embodiment and it is to be understood that other implementations may be utilized and that structural changes and/or substitutions of various elements may be made without departing from the scope and spirit of an example embodiment. The following detailed description is, therefore, not to be construed in a limited sense.

DETAILED DESCRIPTION OF THE INVENTION

Embodiments will be described below in more detail with reference to the accompanying drawings. The following detailed descriptions are provided to assist the reader in gaining a comprehensive understanding or the methods, appearances, and/or systems described herein and equivalent modifications thereof. Accordingly, various changes, modification, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
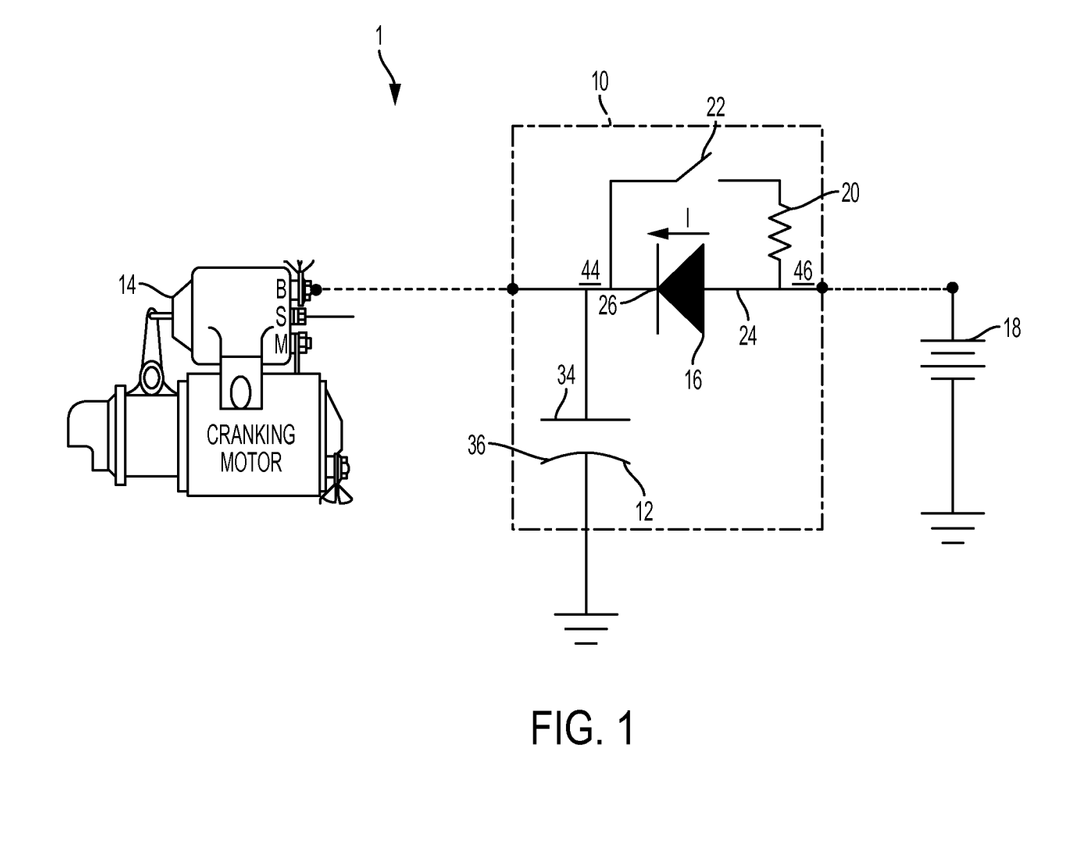
FIG. 1 shows a schematic view of a starting module having an supercapacitor assembly according to an exemplary embodiment.

As shown in FIG. 1, a starting module 1 according to a non-limiting embodiment has a supercapacitor assembly 10, which has a supercapacitor 12 connected to a motor or starter 14 and a blocking diode 16 connected to a power supply 18. In a non-limiting embodiment, the supercapacitor assembly 10 also includes a resistor 20 and a switch 22 which are connected to each other in series, and connected to diode 16 in parallel.

In a non-limiting embodiment, supercapacitor 12 works in conjunction with power supply 18 to provide power to motor 14 to start an engine of a vehicle, such as an internal combustion engine or a 12.7 L diesel engine, for example (not shown). In a non-limiting embodiment, supercapacitor 12 may be recharged from the battery circuit. Further, diode 16 allows the supercapacitor 12 to recharge between starting or cranking attempts using the vehicles own battery even if the state of charge is <50%. Diode 16 allows the charge of the current to flow from power supply 18 to supercapacitor 12, but is designed to prohibit the charge of the current from flowing from supercapacitor 12 to power supply 18. This configuration of starting module 1, for example, improves the durability, efficiency, and longevity of the supercapacitor 12 and power supply 18.

Individual elements of starting module 1 are described in further detail below.

Figure 2:
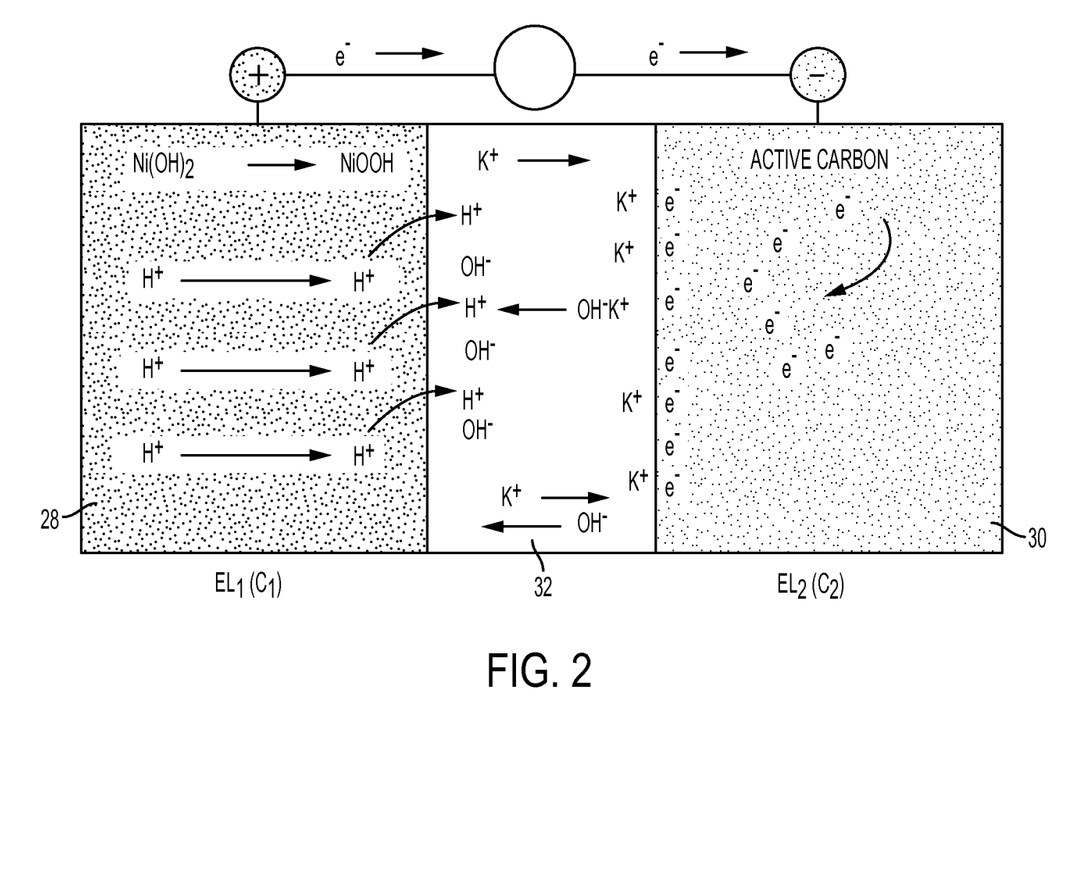
FIG. 2 shows a schematic illustration of ion movement when operating an asymmetric supercapacitor with a positive electrode based on nickel hydroxide and an alkaline electrolyte, respectively, during charging and also during discharging.

Supercapacitor assembly 10 has an asymmetric supercapacitor 12, such as a nickel-carbon asymmetric supercapacitor, which is discussed in U.S. Patent Publication 20120300367, which is incorporated in its entirety by reference. As shown in FIG. 2, a nickel-carbon asymmetric supercapacitor, according to this invention, includes at least one positive electrode 28 comprising an active material mainly consisting of nickel-based hydroxide, at least one negative electrode 30 comprising a mixture of a carbon-based active material and binder, an alkaline electrolyte and at least one separator 32. As shown in FIG. 2, the asymmetric supercapacitor includes the positive electrode 28 ($EL_1$) having capacitance $C_1$ which is an electrode based on a nickel-based hydroxide and the negative electrode 30 ($EL_2$) having capacitance $C_2$ which is an electrode based on active carbon. The positive electrochemically active material is a nickel-based hydroxide. By "nickel-based hydroxide" is meant a nickel hydroxide, a hydroxide mainly containing nickel, but also a nickel hydroxide containing at least one syncrystallized hydroxide of an element chosen from zinc (Zn), cadmium (Cd), magnesium (Mg) and aluminium (Al), and at least one syncrystallized hydroxide of a particular element selected from cobalt (Co), manganese (Mn), aluminium (Al), yttrium (Y), calcium (Ca), zirconium (Zr) or copper (Cu). One syncrystallized hydroxide contained in the nickel hydroxide is a hydroxide forming a solid solution with nickel hydroxide, i.e. occupying, in continuously variable proportion, the atomic sites defined by the crystal lattice of the nickel hydroxide.

The current collector of said positive electrode 28 is nickel, for example, sintered nickel adapted for power applications, i.e. that the discharge current may exceed 500 A for a supercapacitor unit. The negative electrode 30 comprises a current collector and a carbon-based active material. The surface of the current collector is continuous, i.e. it does not include any perforations.

The positive and negative electrodes are separated from one another by a separator 32 that is a porous membrane impregnated with alkaline electrolyte, such as KOH and/or NaOH and/or LiOH. The capacitance $C_1$ of the positive electrode 28 is proportional to the amount of nickel-based hydroxide. The capacitance $C_2$ of the negative electrode 30 results from the formation of an electrostatic double layer at the active carbon/electrolyte interface. This double layer is on the one hand made up by accumulation of electrolyte $K^+$ ions adsorbed at the active carbon surface and also on the other hand made up by accumulation of electrons $e^-$ in the active carbon compensating for the positive electrostatic charge created by adsorption of $K^+$ ions. The capacitance $C_2$ is proportional to the specific surface area of the active carbon. The movement of electrolyte $K^+$ and $OH^-$ ions is illustrated during charging in FIG. 2.

The asymmetric supercapacitor is assembled by conventionally stacking various electrodes and separators. One separator 32 is interposed between one positive electrode 28 and one negative electrode 30. Said three elements are placed in a container. An electrolyte is introduced into the container either before or after placing the electrodes and separators in the container. The positive electrodes 28 are connected to each other and form the positive current output terminal 34 of the supercapacitor and the negative electrodes 30 are connected to each other and form the negative current output terminal 36 of the supercapacitor (see FIG. 1). The container is sealed by means of a lid. In general, the lid supports the current terminals.

Preferably an asymmetric supercapacitor is used in supercapacitor assembly 10. Symmetrical supercapacitors often require extensive isolation mechanisms. However, an asymmetric supercapacitor such as the one described above discharges at a slow rate so it does not require constant recharging.

As shown in FIG. 1, supercapacitor assembly 10 according to an exemplary embodiment includes a diode 16, or a blocking diode. In a non-limiting embodiment, blocking diode 16 is blocking diode of a sufficient power and current rating to support recharge current, for example, a blocking diode rated at 150 Amps. Diode 16 has two terminals, a positive terminal or anode 24, and a negative terminal or cathode 26. Diode 16 allows the charge of current to flow in a forward direction (as indicated by arrow I), or from the anode end or positive terminal 24 to the cathode end or negative terminal 26. However, diode 16 prohibits current flow in a reverse direction, or from the negative terminal to the positive terminal.

As shown in FIG. 1, diode 16 is connected to power supply 18. Power supply 18 is a 12V battery, for example, and power supply 18 provides a forward voltage through diode 16 to motor 14.

In a non-limiting embodiment, the supercapacitor assembly 10 also includes a resistor 20 and a switch 22 which are connected to each other in a series configuration, and connected to diode 16 in a parallel configuration. The configuration of resistor 20, switch 22, and diode 10 are non-limiting and it is contemplated that they may be arranged in series or parallel configuration.

In a non-limiting embodiment, resistor 20 is a 50 W 4Ω resistor, for example. Switch 22 is a bypass switch or a dead battery switch such that if the power supply 18 has low charge or no charge (i.e. 0V), switch 22 may be closed to start motor 14. In a non-limiting embodiment switch 22 may be used, for example, where a charge of power supply 18 is low and the vehicle's ignition system will not turn on by using the power supply 18 alone. In this instance, switch 22 is closed temporality or just before the engine is started to allow the supercapacitor 12 and the power supply 18 to work together or in conjunction with each other to start the vehicle's ignition system or motor 14. That is, switch 22 may be closed to start the engine and provide power to motor 14, but may be opened after a vehicle's engine is started. In a non-limiting embodiment, after the vehicle is started switch 22 may be opened and diode 16 may be used to prevent discharge of supercapacitor 12 to the power supply 18. In other words, when switch 22 is closed, the motor may be started even if the battery has no charge or 0V. In a non-limiting embodiment, a 10 A switch is used.

Figure 3:
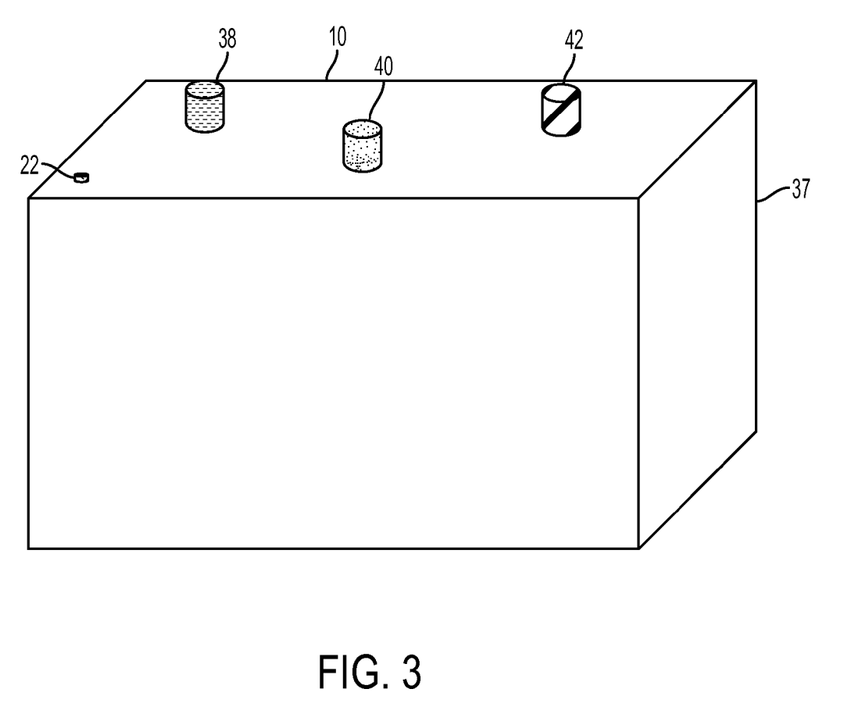
FIG. 3 shows a perspective view of the supercapacitor assembly of according to an exemplary embodiment.

As shown in a non-limiting embodiment of the invention in FIG. 3, the supercapacitor assembly 10 includes a housing 37 with terminals provided on an outer surface of housing 37. FIG. 3 shows three terminals, however, this is non-limiting and any number of terminals may be used. For example, supercapacitor assembly 10 includes a first terminal 38 which electrically connects supercapacitor assembly 10 to motor 14. In a non-limiting embodiment, first terminal 38 is the only terminal which connects motor 14 to supercapacitor assembly 10. That is, there are no other wires or connections attached to motor 14. Supercapacitor assembly 10 also includes a second terminal 40 which electrically connects supercapacitor assembly 10 to power supply 18. Further, as shown in FIG. 3, a third terminal 42 is provided on supercapacitor assembly 10 connected to the ground. As shown in FIG. 3, switch 22 has a terminal located on an outer surface of housing 37. Terminals shown in FIG. 3 are shown on an upper surface of housing 37; however, this position is non-limiting.

In a non-limiting embodiment, FIG. 1 depicts a switch 22 which may be coupled between a first node 44 and a second node 46. The switch 22 is coupled in parallel with diode 16. When switch 22 is closed, the resistor 20 is connected in parallel with the diode 16. Resistor 20 is coupled between first node 44 and second node 46. The power supply 18 is connected between the second node 46 and ground.

A supercapacitor assembly 10 according to a non-limiting embodiment may be used in a small vehicle, in which a supercapacitor, such as a SNC 12-600 capacitor, is electrically connected in parallel configuration with a power supply 18 which has a single 12V battery.

A method of starting the motor 14 as a result of power supply 18 alone not having enough charge to start the motor 14 will now be described. The nickel-carbon asymmetric supercapacitor 12 is connected to diode 16, switch 22, resistor 20, and battery 18. A cathode of the diode 16 is electrically connected to the supercapacitor 12. The switch 22 is closed or activated to effectively remove diode 16 from the circuit. This allows for a temporary supply of energy from supercapacitor 12 to a vehicle's system electronics to allow the motor 14 to be engaged. After starting motor 14, the switch 22 may be opened such that the supercapacitor 12 and the power supply 18 are only coupled together with a diode.

Figure 4:
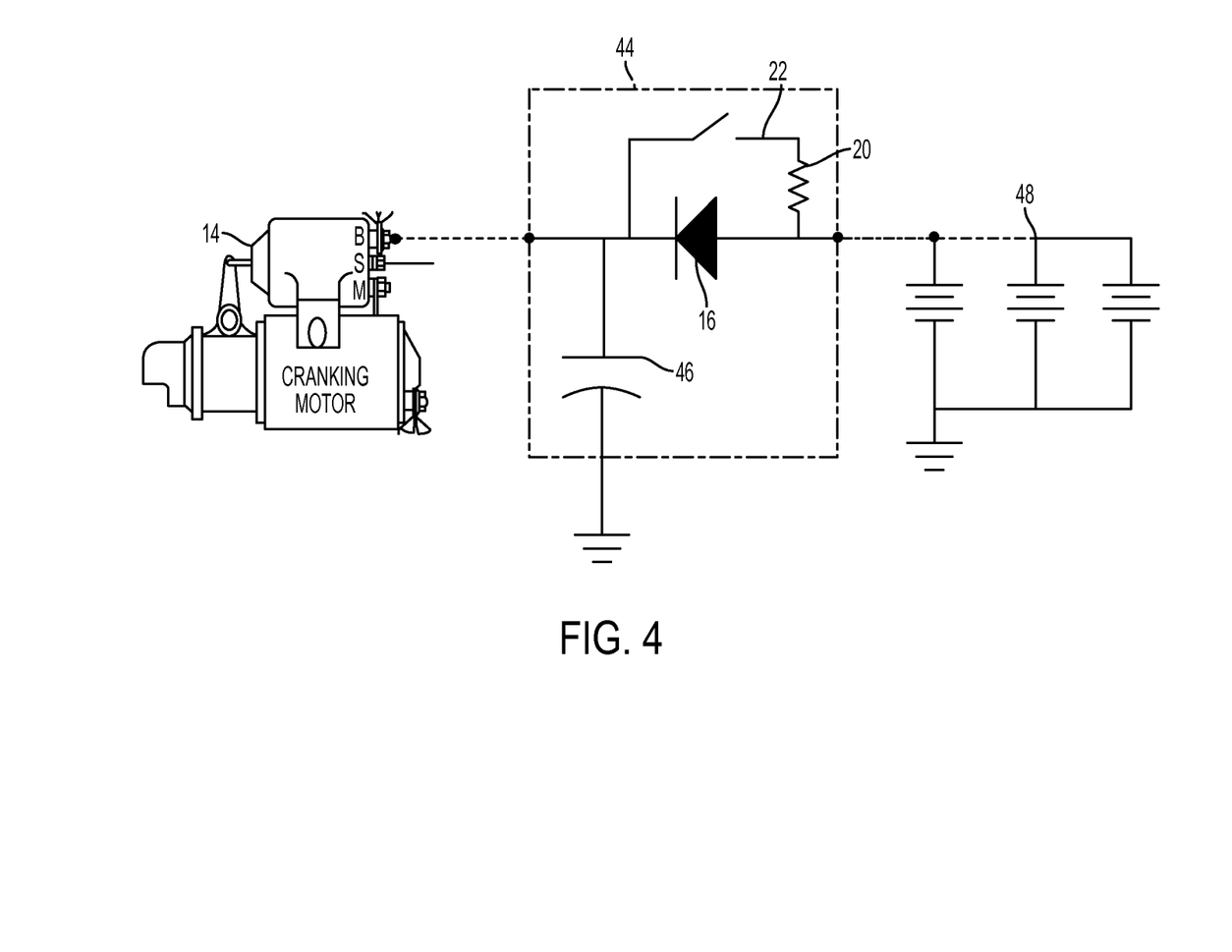
FIG. 4 shows a schematic view of the starting module according to an second exemplary embodiment.

According to another non-limiting embodiment of the instant application as shown in FIG. 4, supercapacitor assembly 44 may have a supercapacitor 46, such as a SNC 12-1000 capacitor, electrically connected in parallel configuration to a power supply 48 which has multiple 12V batteries connected in a parallel configuration. A supercapacitor assembly 44 according to this embodiment may be used in a heavy duty vehicle. All other aspects of this embodiment are similar to the embodiment described above, and like reference numerals are used to describe similar components.

Figure 5:
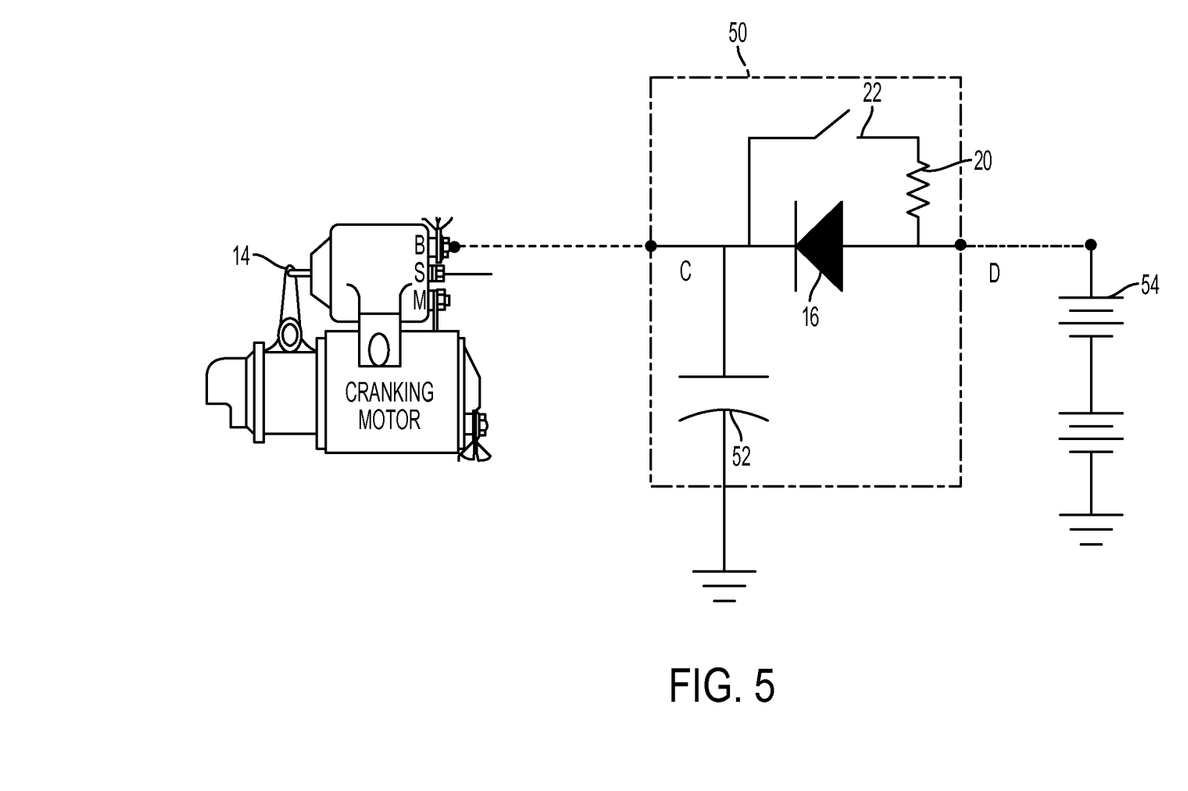
FIG. 5 shows a schematic view of the starting module according to an third exemplary embodiment.

According to another non-limiting embodiment of the instant application as shown in FIG. 5, supercapacitor assembly 50 may have a supercapacitor 52, such as a SNC24-5000 or SNC24-300, electrically connected in a series configuration to a power supply 54 which has a 24V battery or two 12V battery connected in series. A supercapacitor assembly 50 according to this embodiment may be used in a transit bus or heavy equipment truck. All other aspects of this embodiment are similar to the embodiment described above, and like reference numerals are used to describe similar components.

As mentioned above, power supply 18, for example, and supercapacitor assembly 10 are used in conjunction to power a motor 14 to start an engine. As compared to a conventional battery powering a motor 14, supercapacitor assembly 10 according to this invention uses less energy from a power supply, such as a standard 12 V battery, than compared to a battery alone. The comparative energy consumptions used from a battery to start a vehicle's engine are as follows:

1350 Joules: A supercapacitor assembly having an asymmetric supercapacitor and a diode connected to a power supply as described in the embodiments above 1992 Joules: An assembly having a supercapacitor with no diode connected to a battery 4320 Joules: A standard battery As shown from the above, the supercapacitor assembly having an asymmetric supercapacitor and a diode connected to a power supply as described in the embodiments uses less energy from the power supply, which reduces wear on the power supply and preserves the life-time of the power supply. Further, as shown from the above, using a diode in the starting module reduces the energy needed from a power supply. Similar energy reductions are a result of each of the embodiments contemplated above.

Provided below are comparative examples illustrating some of the differences between a supercapacitor assembly having an asymmetric supercapacitor and a diode connected to a power supply as described in the embodiments above verses a standard battery or a standard battery with a supercapacitor and no diode. The tests and examples will be described with respect to the non-limiting embodiment shown in FIG. 5; however, the other embodiments would also produce similar results. For these tests a current probe was placed at locations C and D as shown in FIG. 5. A current probe at location C measured a voltage of supercapacitor 52 and a current probe at location D measured a voltage in power supply 54. For these tests, a power supply of 2 12V batteries connected in series was used, and supercapacitor 52 was a SNC24-500 500 F 120 kJ Nickel Carbon Supercapacitor.

Figure 6:
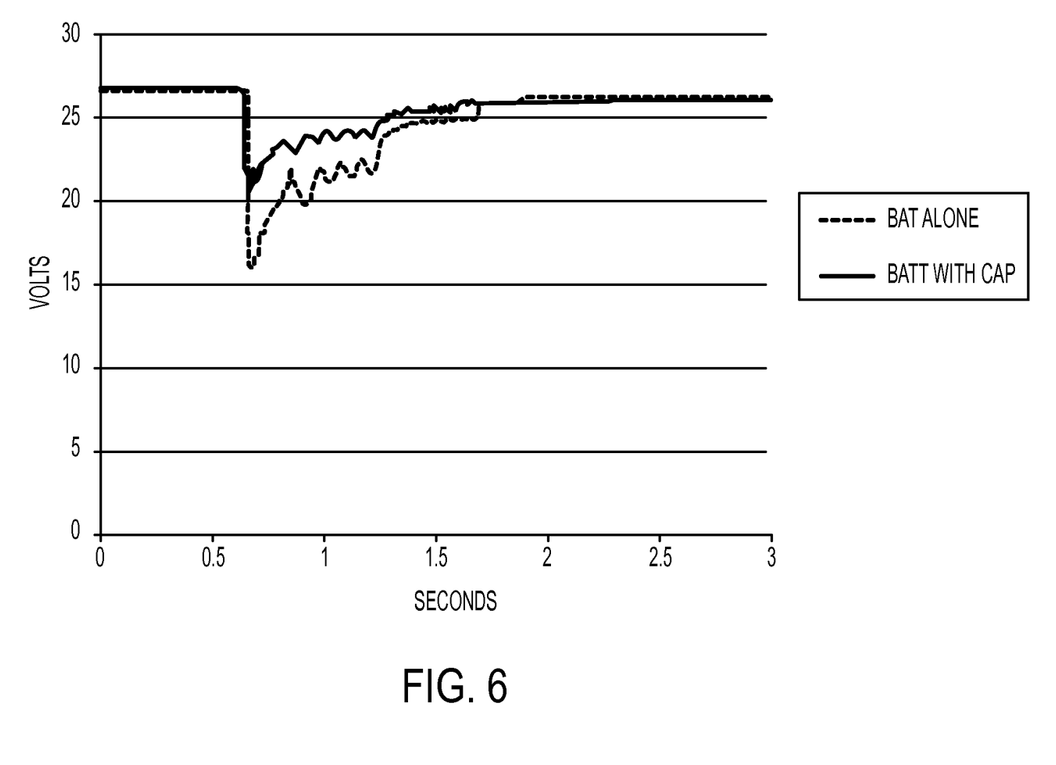
FIGS. 6-9 show the principle and results of tests conducted on the asymmetric supercapacitor according to an exemplary embodiment.

FIG. 6 illustrates the voltage of the power supply during engine starting. As shown in FIG. 6, the voltage of power supply 54, such as a battery, is at approximately 27V when resting. If using power supply 54 alone for an engine start, the voltage of power supply 54 drops to about 15V. In contrast, when implementing supercapacitor assembly 50, the voltage of power supply 54 starts at approximately 27V, but only drops to about 20V. Thus, the drop in voltage of power supply 54 decreases by about 30 percent when using supercapacitor assembly 58 in conjunction with power supply 54 than as compared to using power supply 54 alone. Supercapacitor assembly 50, for example, at least provides an advantage over conventional systems because many vehicles currently require tight control of their electronics and a lower voltage drops in power supplies prevent problems or error codes from arising.

Figure 7:
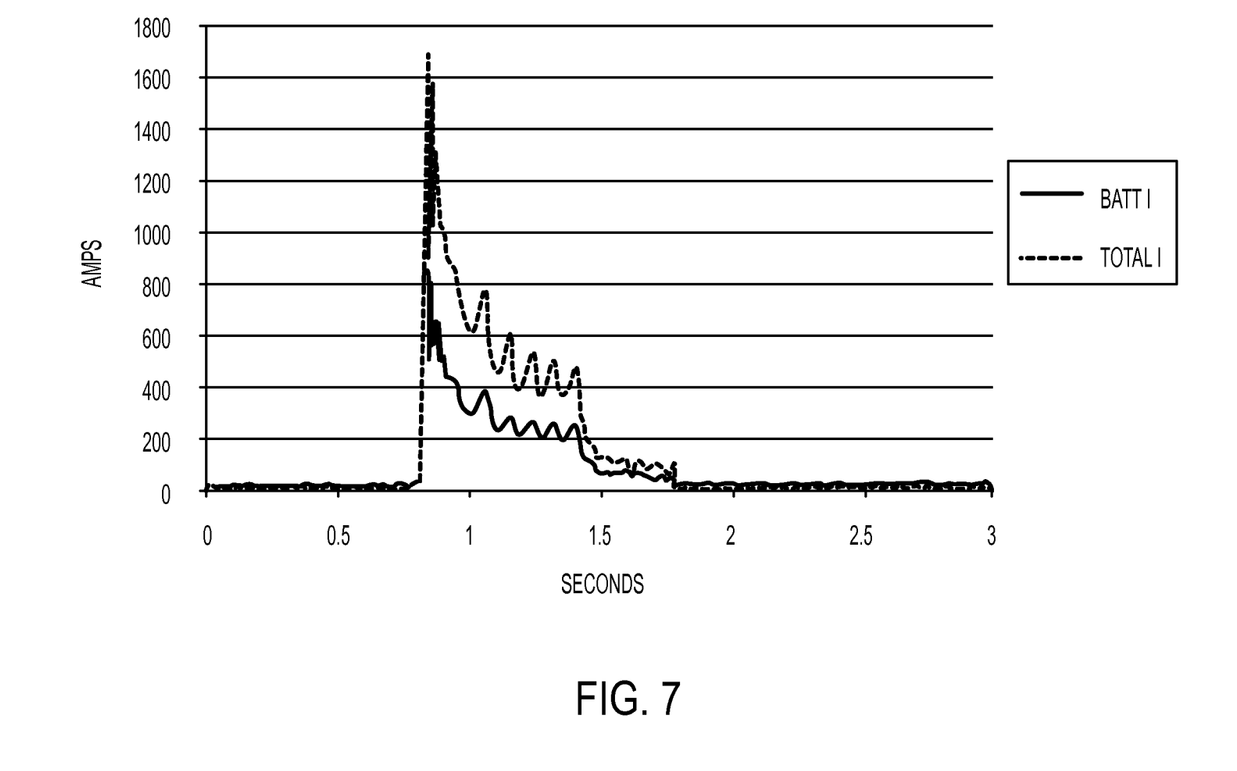

FIG. 7 illustrates the starting current of a starting module 1 of the instant application. FIG. 7 compares the starting current of a supercapacitor assembly 50 according to a non-limiting embodiment of the instant application with a starting current of a power supply 54 alone. As seen in FIG. 7, the total starting current needed to start an engine in this example is approximately 1700 Amps. Power supply 54 in this example provides approximately 800 Amps. Thus, only about 50% of the starting current that is required to start the engine is supplied from power supply 54. By reducing the amount of current that power supply 54 needs to provide to start the engine, the power supply may be better protected and allows for the use of lower cost, longer lasting deep cycle batteries.

Figure 8:
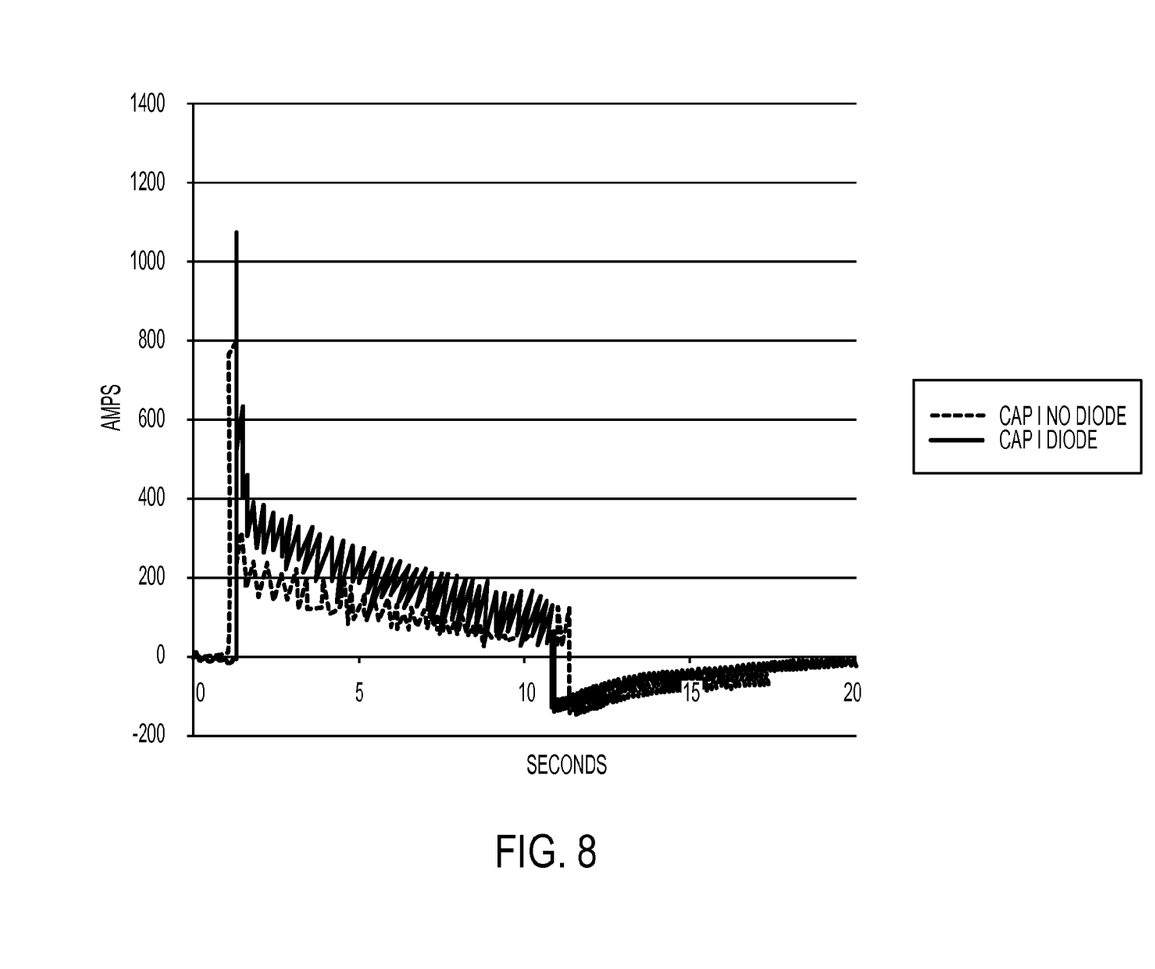

FIG. 8 illustrates the current of a 10 second engine crank in both a supercapacitor assembly 50 having a diode 16 and a supercapacitor without a diode. In both of the examples a power supply 54 is connected to a supercapacitor. As shown in FIG. 8, the supercapacitor assembly 50 with a diode current is a little higher than with the supercapacitor without a diode. This illustrates that the diode helps to limit the batteries involvement in the starting current because it provides more current to the starting current than supercapacitor alone. Thus, a power supply may be better protected and may be more reliable without hindering the start or a power supplies ability to recharge a supercapacitor. The negative current in FIG. 8 illustrates the recharging of the supercapacitor as conducted by the power supply. In this example, the supercapacitor was recharged after approximately 13 seconds.

Figure 9:
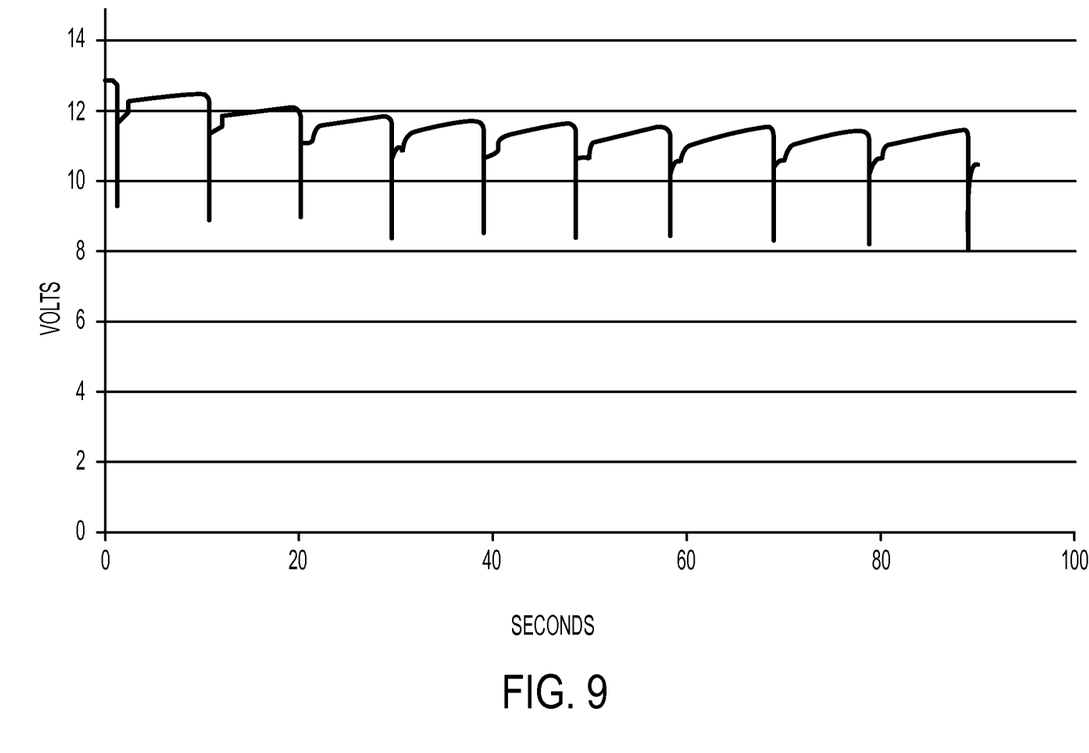

In addition, as shown in FIG. 9, a test was conducted on a SNC12-600 supercapacitor having a diode 16 used in conjunction with a power supply, which for this test was a small motorcycle battery with a 4 AH and 80 CCA rating. A 4.4 L diesel engine was used for this test. The engine was used with the generator or alternator disconnected so no recharging was taking place. Test results showed that the engine could be started over fifty (50) without showing signs of slowing down. In comparison, a similar small battery used alone, could not start the battery, and a similar small battery used with the a supercapacitor could only start the engine about five (5) times before slowing down.

Further, a self-discharging test was conducted on diode 16 of supercapacitor assembly 50, for example; and diode 16 exhibited about a 4 µA reverse voltage leakage at 25V. This is an insignificant amount of leakage and will maintain the supercapacitor charge for a long time.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents. Further, any description of structural arrangement of components or relationship there between is merely for explanation purposes and should be used to limit an example embodiment.

Aspects related to the example embodiment have been set forth in part in the description above, and in part should be apparent from the description, or may be learned by practice of embodiments of the application. Aspects of the example embodiment may be realized and attained using the elements and combinations of various elements and aspects particularly pointed out in the foregoing detailed description and the appended claims. It is to be understood that both the foregoing descriptions are an example and are explanatory only and are not intended to be limiting.

What is claimed is:

1. A supercapacitor assembly comprising:
   an asymmetric supercapacitor having at least one positive electrode, at least one negative electrode, and at least one separator impregnated with an electrolyte;
   a diode having an anode and a cathode, the cathode being electrically connected to the supercapacitor; and
   a switch coupled in parallel with the diode,
   the supercapacitor assembly further comprising a housing enclosing the supercapacitor, the diode and the switch, with at least two terminals located on an outer surface of the housing, a first of the at least two terminals being configured to connect the supercapacitor assembly to a motor and a second of the at least two terminals being configured to connect the supercapacitor assembly to a power supply.

2. The supercapacitor assembly according to claim 1, further comprising a resistor connected in series with the switch and in parallel with the diode when switch is closed.

3. The supercapacitor assembly according to claim 1, wherein the positive electrode of the supercapacitor is connected to the cathode of the diode.

4. The supercapacitor assembly according to claim 1, wherein the at least one positive electrode includes a nickel-based hydroxide and one nickel-based current collector.

5. The supercapacitor assembly according to claim 1, wherein the at least one negative electrode includes an active carbon.

6. The supercapacitor assembly according to claim 1, wherein the electrolyte is an alkaline electrolyte.

7. The supercapacitor assembly according to claim 1, wherein the diode is a blocking diode of sufficient power and current rating to support recharging of the supercapacitor.

8. A starting module comprising:
the supercapacitor assembly according to claim 1,
a motor connected to the supercapacitor of the supercapacitor assembly, and
a power supply connected to the diode of the supercapacitor assembly at a same node.

9. The starting module according to claim 8, wherein the supercapacitor is coupled in parallel with the power supply, and the power supply in conjunction with the supercapacitor supply power to the motor.

10. The starting module according to claim 8, wherein the first terminal is the only terminal which connects the motor to the supercapacitor assembly.

11. The starting module according to claim 8, wherein the diode is a blocking diode of sufficient power and current rating to support recharging of the supercapacitor.

12. A method of starting a motor as a result of a battery not having enough charge to start the motor alone using a starting module comprising the supercapacitor assembly according to claim 7, comprising:
connecting the starting module to the battery;
activating the switch to close the switch and effectively removing the diode from the circuit;
temporarily supplying energy from the supercapacitor to engage the motor;
after starting the motor, opening the switch such that the supercapacitor and the power supply are only coupled together with a diode.

13. A supercapacitor assembly comprising:
a supercapacitor connected to a first node;
a switch connected between the first node and a second node;
a diode coupled in parallel with the switch and having a first terminal connected to the first node and a second terminal connected to the second node,
the supercapacitor assembly further comprising a housing enclosing the supercapacitor, the diode and the switch, with at least two terminals located on an outer surface of the housing, a first of the at least two terminals being configured to connect the supercapacitor assembly to a motor and a second of the at least two terminals being configured to connect the supercapacitor assembly to a power supply.

14. The supercapacitor assembly according to claim 13, further comprising a resistor connected between the switch and the second node.

* * * * *